United States Patent [19]
Adams

[11] Patent Number: 5,695,159
[45] Date of Patent: Dec. 9, 1997

[54] REMOVABLE FASTENER

[75] Inventor: William E. Adams, Portersville, Pa.

[73] Assignee: Adams Mfg. Corp., Portersville, Pa.

[21] Appl. No.: 567,076

[22] Filed: Dec. 4, 1995

[51] Int. Cl.$^6$ ................................................ F16B 15/00
[52] U.S. Cl. ........................................................ 248/71
[58] Field of Search ........................... 248/71, 547, 216.4, 248/216.1, 217.3, 217.4; 411/485, 923

[56] References Cited

U.S. PATENT DOCUMENTS

| | | | |
|---|---|---|---|
| 268,613 | 12/1882 | Brinkerhoff | 2448/71 X |
| 694,996 | 3/1902 | Sauer . | |
| 792,594 | 6/1905 | Hiss Jr. | 248/71 X |
| 1,295,811 | 2/1919 | Stidham | 248/71 X |
| 1,325,202 | 12/1919 | Lawson | 411/485 |
| 1,600,224 | 9/1926 | Grundy . | |
| 2,681,196 | 6/1954 | Lind . | |
| 2,747,821 | 5/1956 | Falk | 248/71 |
| 2,751,174 | 6/1956 | Parker | 248/42 |
| 2,961,210 | 11/1960 | Pfaff et al. . | |
| 2,984,442 | 5/1961 | Lawson . | |
| 3,934,802 | 1/1976 | Jennings | 411/485 |
| 4,669,688 | 6/1987 | Itoh et al. | 248/71 X |
| 4,903,920 | 2/1990 | Merritt | 248/71 |
| 4,988,249 | 1/1991 | Kardefeldt et al. | 248/71 X |
| 5,411,228 | 5/1995 | Morawa et al. | 248/71 X |
| 5,496,005 | 3/1996 | Dieringer | 248/71 X |

Primary Examiner—Leslie A. Braun
Assistant Examiner—Willie Berry, Jr.
Attorney, Agent, or Firm—Buchanan Ingersoll, P.C.

[57] ABSTRACT

A removable fastener for hanging a wire or string decoration support on a wall or other similar structure is provided. The removable fastener has a base having an elongated member extending therefrom. When attached to a wall, the removable fastener and wall surface define a cavity to completely enclose and hold the decoration support to prevent the decoration support from falling off of the removable fastener. A pair of ears preferably extend from the base of the removable fastener to facilitate the removal of the removable fastener with a forked tool such as a claw hammer. The fastener may additionally include an arcuate member for holding ornamental lights. Each removable fastener may be reused numerous times.

8 Claims, 4 Drawing Sheets

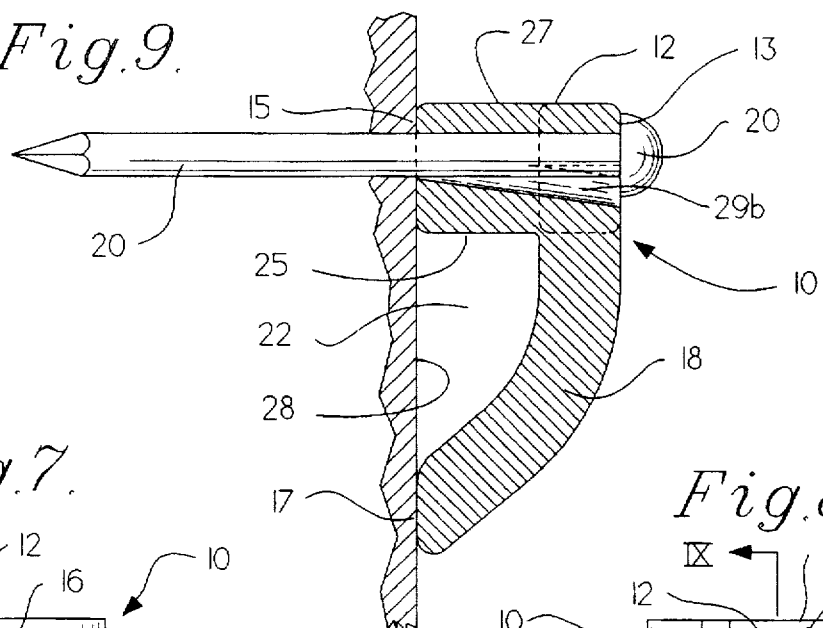
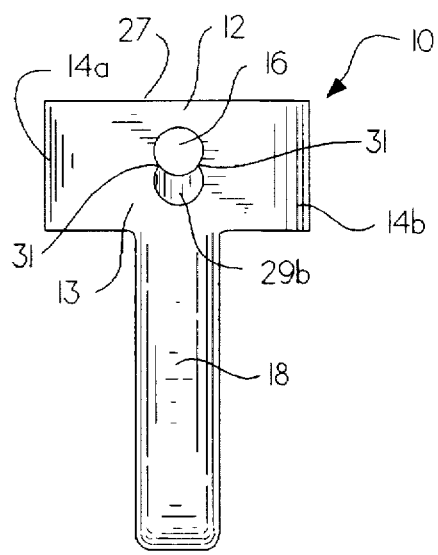
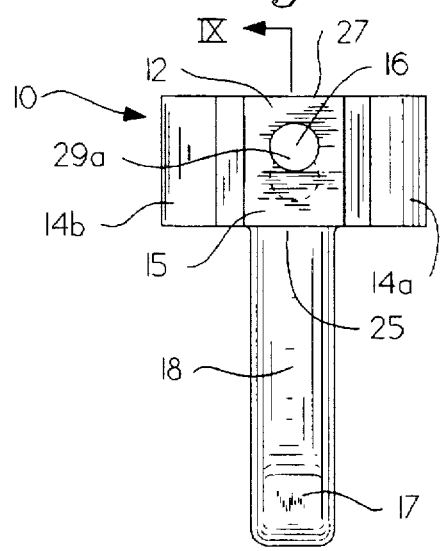
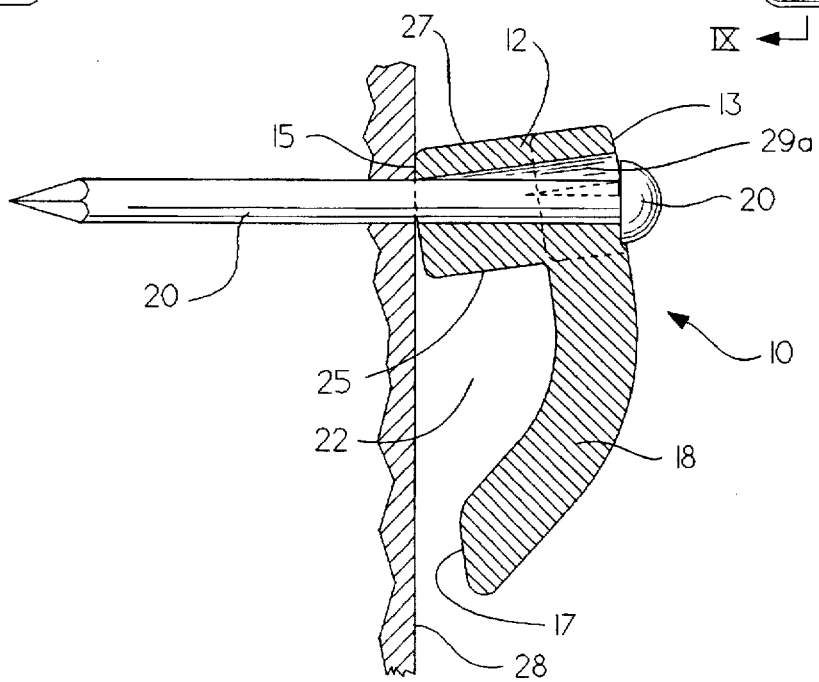

REMOVABLE FASTENER

BACKGROUND OF THE INVENTION

1. Field of the Invention

The invention relates to fasteners for holding ornamental objects, wires and other decoration supports, and more particularly to fasteners which securely hold ornamental objects including decoration supports and are easy to remove.

2. Background of the Invention

Festive decorating has been a favorite pastime for many years. Many decorations, such as Christmas lights, are hung around the doors and windows and on the walls and siding of a house. These decorations are usually hung for only a few weeks during the year.

Conventional devices for hanging string decorations and lights include nails, staples, screw-in hooks, suction cups, and clips which fit over gutters or between shingles or siding. However, it is not uncommon for the decorations or lights to fall from clips and some screw-in hooks during heavy wind. Nails, staples and other screw-in hooks are more secure, but are difficult to remove.

Numerous fasteners exist for securely fastening conduits, cables, pipes and the like to a flat surface, but these devices have inherent drawbacks. None of the devices permit easy removal of the conduit and fastener after the devices are secured. In addition, some of these fasteners include or are relatively expensive metal stampings. Examples of these fasteners are shown in U.S. Pat. Nos. 694,996, 1,600,224, 2,681,196 and 2,984,442. They generally include an arcuate member for holding a conduit, and a securing member, such as a nail, for fastening the arcuate member and the conduit therein to a base or wall.

The fastening device shown in U.S. Pat. No. 2,961,210 additionally shows a boss integrally formed with the arcuate member. The boss is compressed around the securing member upon the placement and fastening of the device. This compression of the boss securely holds the securing member within the arcuate member.

SUMMARY OF THE INVENTION

The invention provides for a simple fastener which securely holds a wire or string decoration support to a surface such as a wall, and may be easily removed for storage and later reuse.

The removable fastener in accordance with the present invention includes a base and a first elongated member attached to a lower surface of the base. The first elongated member extends outwardly from the base and terminates in a free end.

The removable fastener additionally includes a pair of ears which extend outwardly from the base. The ears are configured for engagement by the forks of a claw hammer to facilitate the removal of the removable fastener from the wall surface. Each removable fastener may be reused numerous times.

A second end of the base and the free end of the first elongated member may be attached to a wall surface to hold the decoration support. The base, first elongated member and wall surface form a cavity to securely hold the decoration support therein.

One embodiment of the removable fastener further includes a longitudinal hole which extends through the base. A securing device may be inserted into the hole to secure the removable fastener to the wall surface. The longitudinal hole may include a plurality of channels permitting the removable fastener to be moved from a first position to a second position and thereby enabling the decoration support to be hung on or removed from the removable fastener without the removal thereof.

The removable fastener may also include a second elongated member attached to an upper surface of the base for holding an additional decoration support. The elongated members may include indentations permitting each elongated member to flex relative to the base and creating a gap between the wall surface and the removable fastener. Accordingly, a decoration support may thereafter be placed within the cavity or removed therefrom without removing the removable fastener from the wall. Furthermore, the elongated members may include tabs to facilitate grasping of the elongated members by an user while bending the same.

An additional embodiment of the fastener includes an arcuate member for holding at least one ornamental light. The arcuate member may be S shaped to hold ornamental lights of various sizes.

A complete understanding of the invention will be obtained from the following description and the accompanying figures.

BRIEF DESCRIPTION OF THE DRAWINGS

FIG. 7 is a front view of a removable fastener having a modified two channel hole.

FIG. 8 is a rear view of the removable fastener shown in FIG. 7.

FIG. 9 is a cross-sectional view of the removable fastener shown in FIG. 7 in a first position taken along line IX—IX of FIG. 8.

FIG. 10 is a cross-sectional view of the removable fastener shown in FIG. 9 in a second position.

DETAILED DESCRIPTION OF THE PREFERRED EMBODIMENTS

Figure 1:
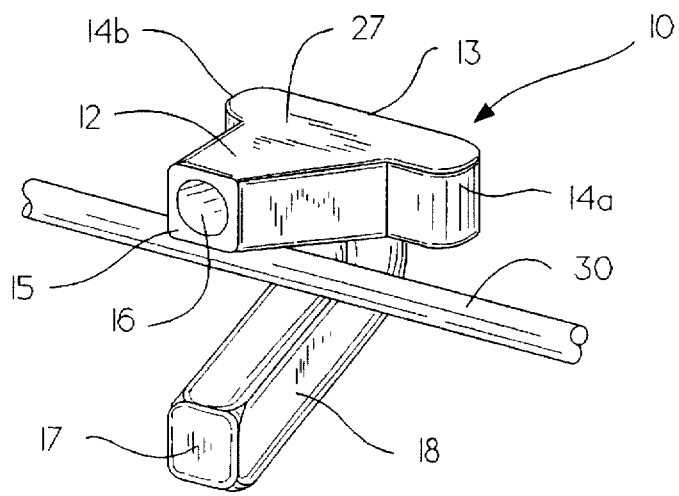
FIG. 1 is a perspective view of a first embodiment of the removable fastener in accordance with the present invention.

As shown in FIG. 1, the removable fastener 10 in accordance with the present invention includes a base 12 having a first end 13 and a second end 15. The base 12 preferably includes a hole 16 extending longitudinally through the base 12 from the first end 13 to the second end 15.

The removable fastener 10 also includes a first elongated member 18 attached to the first end 13 of the base 12 at a lower surface 25 thereof. The first elongated member 18 is preferably arcuate and defines a portion of a cavity 22 as shown in FIG. 2.

A nail 20, screw or other securing device having an elongated shaft exceeding the length of the base 12, may be utilized to secure the removable fastener 10 to a wall 28, molding or other similar surface. In particular, a pointed end of the nail 20 is inserted into the hole 16 at the first end 13 of the base 12. The nail 20 is subsequently driven through the base 12 and into the wall 28 such that the second end 15 of the base 12 and the free end 17 of the first elongated member 18 abut the wall 28. The hole 16 is preferably sized to provide a friction fit with the nail 20. The first elongated member 18 may be grasped during the securing of the removable fastener to the wall 28.

Figure 2:
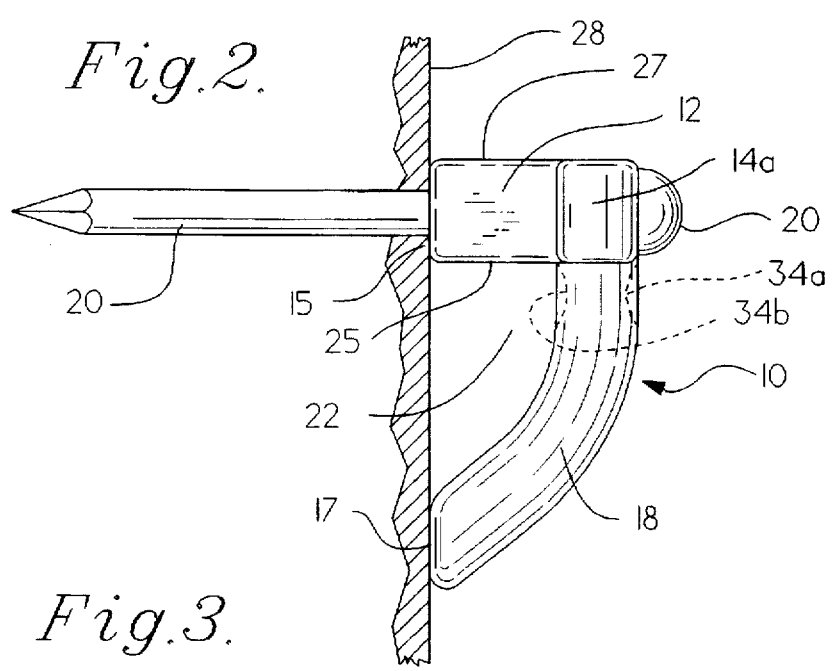
FIG. 2 is a side view of the removable fastener shown in FIG. 1 attached to a wall.

The base 12 preferably extends from a first end 13 to a second end 15 thereof as shown in FIG. 2. An extended base 12 having a hole 16 throughout the length thereof provides lateral support to a nail 20 being utilized to secure the removable fastener 10 to the wall 28. Accordingly, fewer nails 20 are bent during the securing of the removable fastener 10 and thinner nails 20 may be utilized to minimize damage to the wall 28.

The removable fastener 10 may alternatively include an adhesive 23 at the second end 15 of the base 12 and the free end 17 of the first elongated member 18. The adhesive 23 may be utilized to bond the removable fastener 10 to the surface of the wall 28.

As shown in FIG. 2, the free end 17 of the first elongated member 18 and the second end 15 of the base 12 preferably lie in a common plane. Therefore, the base 12 and the first elongated member 18 of the removable fastener 10 and the surface of the wall 28 define an enclosed cavity 22 once the removable fastener 10 is secured to the wall 28.

A decoration support 30, such as a wire strand or a string, for hanging lights or ornaments may be placed within the cavity 22 during the fastening of the removable fastener 10 to the wall 28. The removable fastener 10 may be attached in any convenient orientation to the wall 28 to hold the decoration support 30. The decoration support 30 is completely enclosed within the cavity 22 once the removable fastener 10 is secured to the wall 28.

Accordingly, any vertical movement of the decoration support 30, which may dislodge a decoration support 30 hung by a conventional nail or screw-in hook, will not dislodge a decoration support 30 within the cavity 22 of the removable fastener 10.

Figure 3:
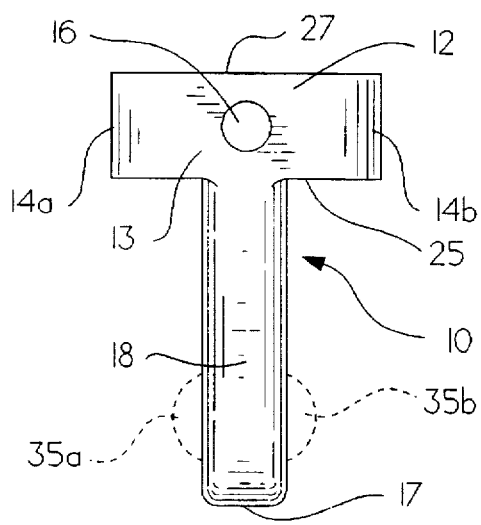
FIG. 3 is a front view of the removable fastener shown in FIG. 1.

The removable fastener 10 includes a pair of ears 14 attached to the base 12 as shown in FIG. 3. A first ear 14a is attached to a first side of the base 12 and a second ear 14b is attached to a second side of the base 12 at the first end 13 thereof. The ears 14 facilitate the removal of the removable fastener 10 from the wall 28.

Figure 4:
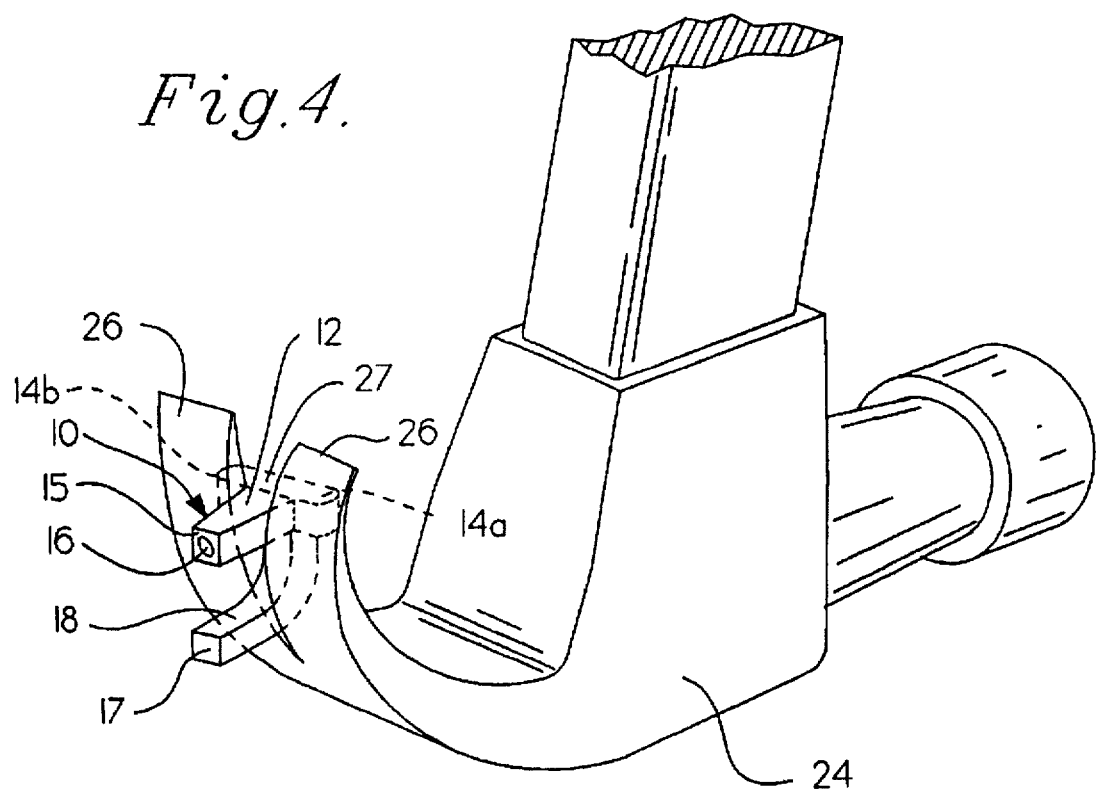
FIG. 4 is a perspective view of the removable fastener shown in FIG. 1 engaged with a claw hammer.

As shown in FIG. 4, a claw hammer 24 or similar device may be utilized to easily remove the removable fastener 10 from a wall 28. Specifically, the base 12 of the removable fastener 10 is preferably configured to fit between the forks 26 of the claw hammer 24. The forks 26 of the claw hammer 24 may be rotated outward from the wall 28 once the base 12 of the removable fastener 10 is placed between the forks 26.

The forks 26 of the claw hammer 24 slide along the first side and second side of the base 12 during rotation of the claw hammer 24 until they engage the pair of ears 14. Any further outward movement of the forks 26 will move the removable fastener 10 away from the wall 28. The first end 13 of the base 12 of the removable fastener 10 will subsequently engage a head of the nail 20 and pull the nail 20 and removable fastener 10 partially or completely away from the wall 28 thereby facilitating the removal of the removable fastener 10.

Additionally, a claw hammer 24 may be utilized in the same manner to remove the removable fastener 10 if an adhesive 23 is used to attach the second end 15 of the base 12 and the free end 17 of the first elongated member 18 to the wall 28.

The utilization of a nail 20 to attach the removable fastener 10 to the wall 28 is preferred inasmuch as the removable fastener 10 is not deformed or structurally weakened by the use thereof and the removable fastener 10 may thereafter be reused numerous times.

Figure 5:
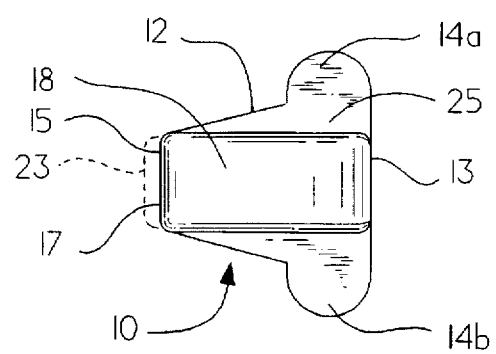
FIG. 5 is a bottom view of the removable fastener shown in FIG. 1.

As shown in FIG. 5, the base 12 may be tapered from the ears 14 to the second end 15 of the base 12 to improve the strength of the removable fastener 10. The base 12 of the removable fastener 10 is preferably ⅛" from the first end 13 to the second end 15 along a longitudinal axis. The removable fastener 10 is preferably ½" from a first ear 14a to a second ear 14b, and ¹³⁄₁₆" from an upper surface 27 of the base 12 to the free end 17 of the first elongated member 18.

Figure 6:
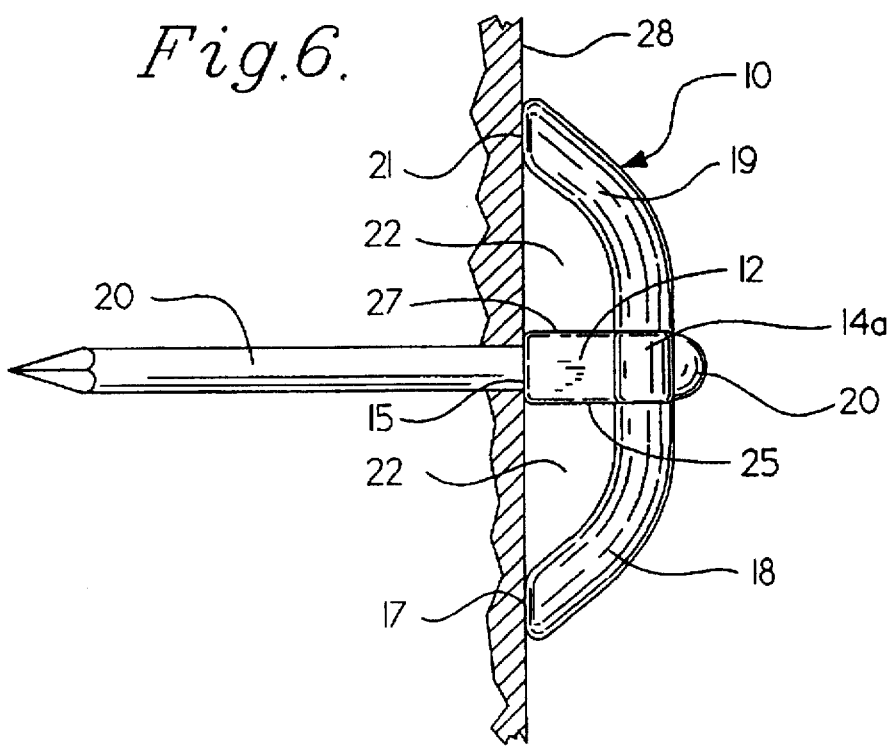
FIG. 6 is a side view of a second embodiment of the removable fastener in accordance with the present invention.

A second embodiment of the removable fastener 10 in accordance with the present invention is shown in FIG. 6. In particular, the second embodiment of the removable fastener 10 includes a second elongated member 19 attached to an upper surface 27 of the base 12. The second elongated member 19 extends outwardly from the base 12 and terminates in a free end 21. The free end 21 of the second elongated member 19 preferably lies in the same plane as the second end 15 of the base 12 and the free end 17 of the first elongated member 18.

The second embodiment of the removable fastener 10 may be attached to the surface of a wall 28 as shown in FIG. 6. The base 12, second elongated member 19, and the surface of the wall 28 form a second cavity 22 to hold a second decoration support 30 or electrical cord.

The removable fastener 10 may alternatively include a modified hole 16 as shown in FIG. 7. The modified hole 16 includes a first channel 29a and a second channel 29b. Ridges 31 preferably define the first channel 29a and the second channel 29b and retain the nail 20 within either the first channel 29a or the second channel 29b.

The second channel 29b preferably tapers toward the first channel 29a and only the first channel 29a is visible from the rear view of the removable fastener 10 as shown in FIG. 8.

Referring to FIG. 9, the first channel 29a extends longitudinally through the base 12 of the removable fastener 10. The second channel 29b extends at least partially through the base 12 and is tapered toward the first channel 29a. The removable fastener 10 is in a first position in FIG. 9 to hold the decoration support 30 therein.

The modified hole 16 enables the removable fastener 10 to be moveable from a first position 32a to a second position 32b as shown in FIG. 10. The nail 20 is usually held within the first channel 29a. The removable fastener 10 may be rotated upwards and the nail 20 is thereby moved from the first channel 29a to the second channel 29b. A gap is created between the first elongated member 18 and the wall 28 when the nail 20 is within the second channel 29b and a decoration support 30 may thereafter be placed within the cavity 22 or removed therefrom without removing the removable fastener 10 from the wall 28. As a result, the removable fastener 10 may remain secured to the wall 28 when not in use.

Figure 11:
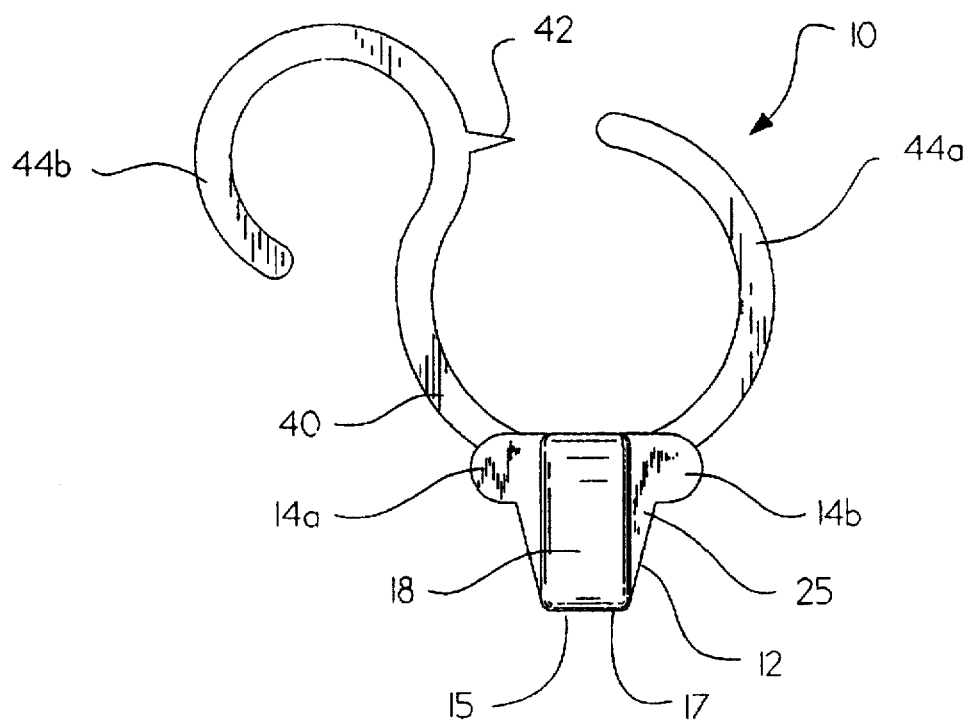
FIG. 11 is a bottom view of a fastener having an arcuate member attached to an upper surface of the base in a first orientation.
Figure 12:
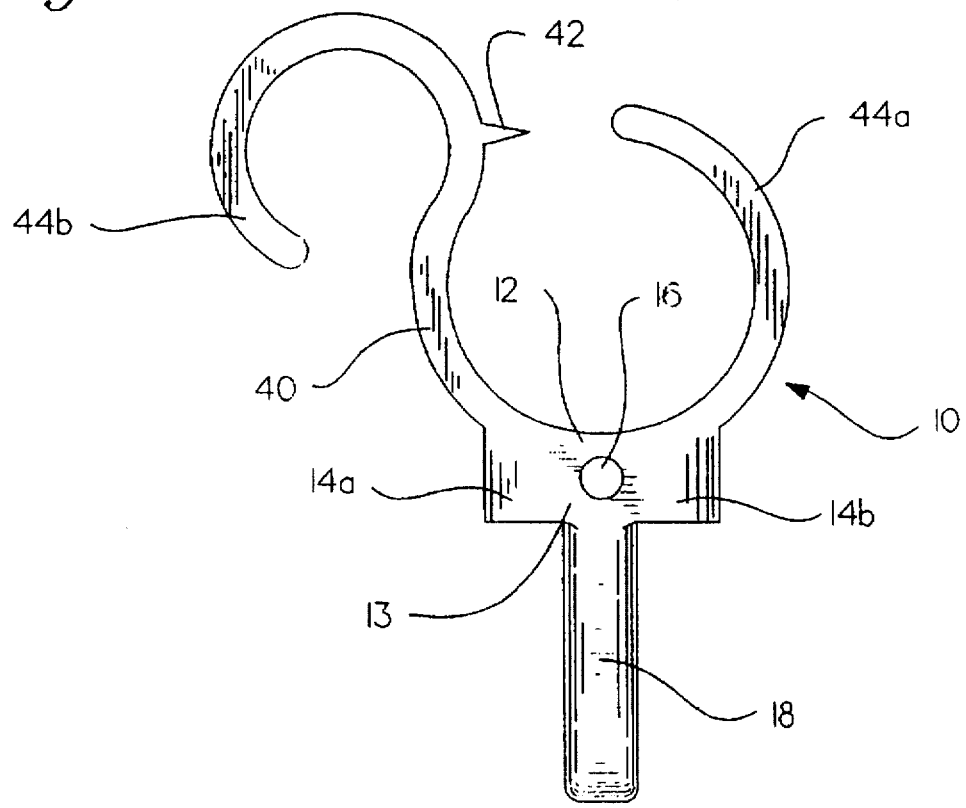
FIG. 12 is a front view of a fastener having an arcuate member attached to an upper surface of the base in a second orientation.

An additional embodiment of the removable fastener 10 is shown in FIG. 11 and FIG. 12. This embodiment of the removable fastener 10 includes an arcuate member 40 attached to an upper surface of the base 12. The arcuate member 40 is preferably configured to hold an object such as an ornamental light and may be an S shaped member as shown in FIG. 11 and FIG. 12. The arms 44a, 44b of the S shaped member may define arcs having different diameters to securely hold ornamental lights of various sizes.

The arcuate member 40 may be oriented as shown in FIG. 11 to hold an ornamental light parallel to the surface of the wall 28. Alternatively, the arcuate member 40 may be oriented as shown in FIG. 12 to hold an ornamental light perpendicular to the surface of a wall 28. An arcuate member 40 urges the wires connected to the ornamental light to lie against the surface of the wall 28 thereby improving the positioning, appearance and security of the ornamental lights.

The smaller radius arm 44b is preferably wider than the larger radius arm 44a to provide a friction fit and securely hold a smaller radius ornamental light in an upright or outward position depending upon the orientation of the arcuate member 40. The arcuate member 40 may include a rib 42 to securely hold an ornamental light within the larger radius arm 44a.

The removable fastener 10 is preferably fabricated from a plastic such as polypropylene. The first elongated member 18 and the second elongated member 19 may be formed to be sufficiently elastic and/or include indentations 34a, 34b as shown in FIG. 2 to permit each elongated member 18, 19 to be bent away from the wall 28 creating a gap therein. Accordingly, a decoration support 30 may thereafter be placed within the cavity 22 or removed therefrom without removing the removable fastener 10. Furthermore, the elongated members 18, 19 may include tabs 35a, 35b as shown in FIG. 3 to facilitate grasping of the elongated members 18, 19 by an user while bending the same.

The removable fastener 10 may alternatively be fabricated from low carbon steel, bronze, aluminum or copper for applications wherein a stronger fastener is required.

While preferred embodiments of the invention have been shown and described herein, it will be appreciated by those skilled in the art that various modifications and alternatives to the disclosed embodiments may be developed in light of the overall teachings of the disclosure. Accordingly, the disclosed embodiments are meant to be illustrative only and not limiting to the scope of the invention which is to be given the full breadth of the following claims and all equivalents thereof.

I claim:

1. A removable fastener attachable to a wall surface to securely hold a decoration support, comprising:

a. a base having a first end and a second end;

b. a first elongated member attached to a lower surface of said base at the first end thereof and said first elongated member extending outwardly therefrom and terminating at a free end wherein said base includes a hole to receive a nail from the first end of said base to the second end thereof, the hole includes a first channel and a second channel and the first channel extends from the first end of said base to the second end thereof and the second channel extends from the first end of said base and tapers towards the first channel; and c. a pair of ears attached to said base and said base and said ears being configured to enable the removable fastener to be grasped by a claw hammer;

wherein said base and said first elongated member when placed adjacent the wall surface will with the wall surface form a cavity to hold the decoration support.

2. The removable fastener of claim 1 wherein the free end of said first elongated member and the second end of said base lie in a common plane.

3. The removable fastener of claim 1 further comprising a second elongated member attached to an upper surface of said base at the first end thereof and said second elongated member extending outwardly therefrom and terminating at a free end.

4. The removable fastener of claim 3 wherein the free end of said first elongated member and the free end of said second elongated member and the second end of said base lie in a common plane.

5. The removable fastener of claim 1 further comprising at least one tab attached to said first elongated member.

6. The removable fastener of claim 1 wherein said first elongated member includes at least one indentation enabling said first elongated member to flex relative to said base.

7. The removable fastener of claim 1 further comprising an arcuate member attached to an upper surface of said base to hold an ornamental light.

8. The removable fastener of claim 7 wherein said arcuate member is a S shaped member having a plurality of arms to securely hold a plurality of ornamental lights having different sizes.

* * * * *